Nov. 18, 1941.         B. YORK         2,263,229
BOLT CUTTER
Filed Feb. 15, 1940
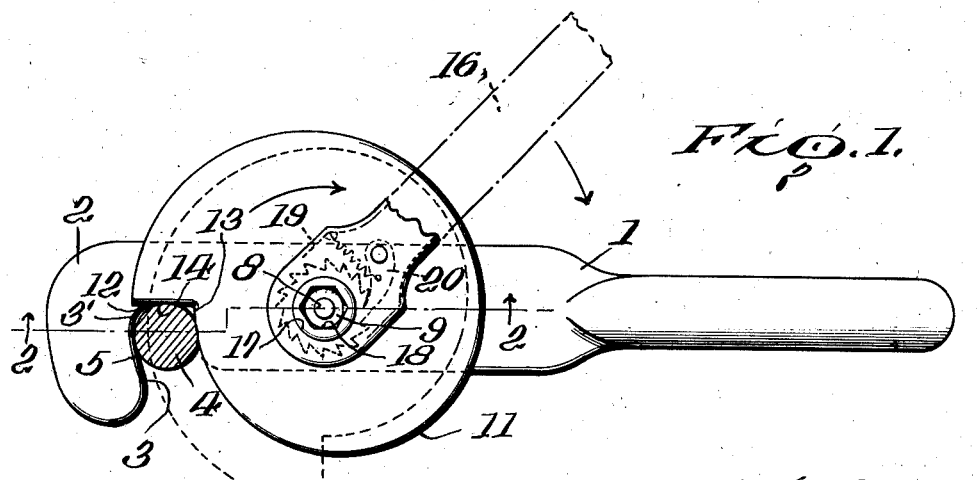
FIG. 1.
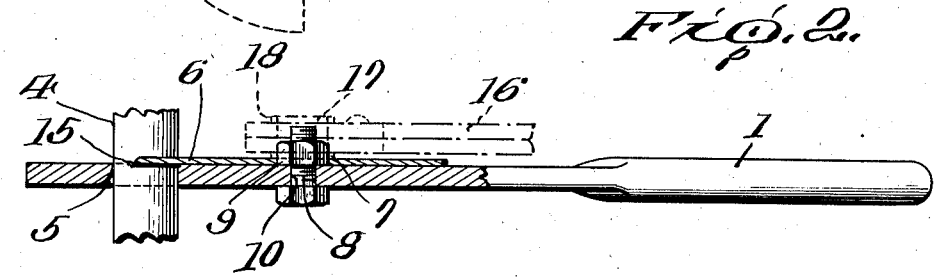
FIG. 2.
FIG. 3.
FIG. 4.
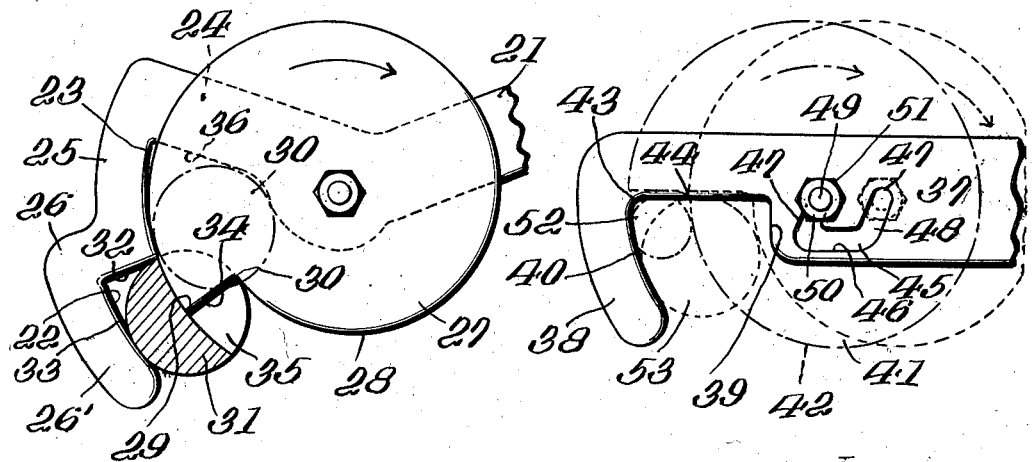
INVENTOR
Burton York
By Percy H. Moore
ATTORNEY Patented Nov. 18, 1941

2,263,229

UNITED STATES PATENT OFFICE 2,263,229

BOLT CUTTER

Burton York, Bakersfield, Calif.

Application February 15, 1940, Serial No. 319,157

4 Claims. (Cl. 30—240)

This invention relates to a cutting tool particularly adapted for cutting or shearing bolts and the like.

The principal object of the present invention is to provide a cutting, shearing or clipping tool for bolts and the like having a novel cutting blade for severing the bolt.

Another object is the provision of a cutting tool having a rotatable cutting blade and a means for rotating the same to assure of the severing of a bolt.

A further object is to provide a bolt cutting tool incorporating a novel rotatable cutting blade adapted to gradually and completely sever a bolt as the blade is rotated relative thereto.

A still further object is the provision of a cutting or clipping tool for bolts and the like wherein the cutting blade is formed with a gradiently curved cutting edge whereby rotation of the blade, relative to a fixed bolt, will assure of the complete and uniform shearing of the bolt.

These and other objects of the invention will be apparent as the specification is considered in connection with the accompanying drawing wherein Figure 1 is a side elevation of the preferred embodiment of the cutting tool, showing a bolt in position prior to the cutting thereof;

Figure 2 is an edge view of the cutting tool, partly in section along the line 2—2 of Figure 1;

Figure 3 is a side elevation of a portion of a modified form of cutting tool, wherein the handle is provided with two bolt engaging recesses to accommodate and permit of the cutting of larger bolts; and Figure 4 is a side elevation of a portion of a further modified form of cutting tool having a cutting disc adjustably mounted on the handle so that bolts of varying diameters may be sheared.

Referring more particularly to the drawing, wherein like reference characters designate similar parts throughout the several views, the numeral 1 indicates generally the bolt cutting tool embodying an elongated handle, preferably of metal, having a laterally extending projection or jaw 2 on one end thereof, cut away, as at 3, to provide a recess for a bolt 4, or other object to be cut. The inner face of the projection is preferably curved eccentrically to permit of the bolt being firmly gripped in position, and this inner edge is beveled or otherwise sharpened, to form a cutting edge 5.

A relatively thin cutting disc 6 is rotatably mounted on the handle 1, by virtue of the substantially hexagonal opening 7 therein being sleeved over a hexagonal lock nut 9, mounted on a threaded bolt 8 extending through an opening 10 in the handle. By rotating the lock nut 9, in a manner presently to be described, the cutting disc is rotated relative to the bolt 4, positioned in the bolt recess 3 in the handle. The disc 6, preferably constructed of metal or other suitable material, is formed with an eccentrically curved peripheral edge 11 with the gradient or curve thereof beginning with and extending from the point 12 on the periphery and gradually increasing in curvature to the point 13 below and inset from the point 12 to complete an eccentrically or irregularly shaped disc. Thus, the arc or curvature of that portion of the peripheral edge adjacent the point 13 will likewise be inset or spaced inwardly from the main portion of the peripheral edge, that is the portion adjacent the point 12, and a relatively straight or vertical marginal edge 14 extends between the points 12 and 13, for a purpose presently described.

The peripheral edge 11 of the disc is bevelled or sharpened to provide a relatively sharp cutting or shearing edge 15. The disc is rotated in a clockwise direction by any suitable means such as a conventional ratchet handle or bar 16. The ratchet handle is provided with the usual ratchet mechanism, including a sleeve 17, rotatably mounted in the upper end thereof and formed with a hexagonal bore 18, adapted to receive the lock nut 9. A pawl 20, pivotally mounted in the ratchet handle, engages with ratchet teeth 19 on the sleeve when the ratchet handle is actuated in a clockwise direction and thereby rotates the sleeve 17, lock nut 9 and cutting disc in a corresponding clockwise direction. While a ratchet mechanism has been described and illustrated, it is to be understood that any other suitable means may be employed to rotate the cutting disc.

When it is desired to cut a bolt, the disc is rotated to the full line position of Figure 1, whereby the perpendicular marginal edge 14 of the disk is aligned with the side wall 3' of the bolt receiving recess, and the curved peripheral edge 11 of the disc, adjacent the point 13, is substantially parallel with the curved top edge 5 of the bolt recess. The tool handle is then assembled on the bolt 4 so that the latter extends through the bolt receiving recess 3. In this position, the bolt 4 will be engaged by the curved cutting edge 5 of the recess and that portion of the peripheral cutting edge 15 of the cutting disc 6 adjacent to the point 13. The disc is now rotated in a clockwise direction, by the ratchet mechanism, so that the gradient or curve of the peripheral edge 15 decreases in curvature, from the point 13 to the point 12, and the cutting edge gradually cuts into the stationary or fixed bolt 4 and presses or forces the bolt against the cutting edge 5 of the recess 3. Thus, when that portion of the cutting edge at the point 12 is rotated approximately 360°, that is moved across the bolt receiving recess, the bolt will have been completely severed or clipped. In other words, the peripheral cutting edge of the disc, due to the eccentric shape thereof, is simultaneously caused to pass over and cut and press or bite into the bolt, whereby the bolt is both cut and clipped, with the clipping being accomplished by the cutting edge of the disc forcing or pressing the bolt against the cutting edge 5 of the bolt recess 3. Therefore, the bolt is assured of being quickly, uniformly and completely severed or sheared with only a minimum degree of effort on the part of the operator.

It is to be understood that the cutting disc may be readily removed for sharpening or replacement and that a larger or smaller disc may be mounted on the same handle, when it is necessary to cut a bolt of a different size or shape. It may also be desirable to substitute a disc having a notched, toothed or other cutting edge for the bevelled or smooth cutting edge shown.

In the modification illustrated in Figure 3, a cutting tool is provided with means for cutting or shearing bolts of larger size, without necessitating the use of different cutting discs. The upper end of the tool handle 21 is provided with two bolt receiving recesses 22 and 23 formed by extending the upper end thereof upwardly and outwardly, as at 24, inwardly in substantially an arc, as at 25, upwardly, as at 26, and thence inwardly in substantially an arc, as at 26' whereby the recess 23 is spaced below and slightly offset from the upper bolt recess 22. A cutting disc 27, corresponding in shape and size with the disc 6 of the preferred form of cutter, and rotatably mounted on the handle 21 in a similar manner, is formed with an eccentrically curved peripheral cutting edge 28 wherein the gradient or curve thereof, beginning with the point 29 on the periphery, extends and gradually increases in curvature to a point 30 on the periphery immediately below and inset from the point 29.

When a relatively large bolt 31 is to be cut, the bolt is assembled in the upper bolt receiving recess 22 and the disc 27 is rotated until the marginal edge 34, extending between the points 29 and 30, is aligned with the vertical side wall 32 of the recess 22. In this position of the disc, that portion of the curved periphery adjacent the point 30 will engage the bolt and press the latter against the curved underside 33 of the bolt recess so that the bolt is firmly gripped in position. The disc is then rotated approximately 360° whereby that portion of the curved peripheral cutting edge 28 at and adjacent the point 29 is moved across the bolt receiving recess 22. Due to the relatively large diameter of the bolt 31 and its position relative to the cutting edge of the disc, the curved cutting edge will only form a substantially arcuate slot 35 in or cut through one half of the bolt. The bolt is then positioned in the lower bolt receiving recess 23, in the dotted line position of Figure 3. In this position, the disc is rotated until the marginal edge 34 is aligned with the side wall 36 of the recess and the peripheral cutting edge of the disc, adjacent point 30, will extend into and fill the slot 35, formed in the bolt during the cutting operation just described. It may be desirable to reduce the thickness of the peripheral edge of the disc, adjacent the point 30, that is, to make the same slightly thinner than the remainder of the peripheral edge of the disc, in an obvious manner, not shown, so that the cutting edge will readily fit into and fill the arcuate slot 35 in the bolt. The disc 27 is again rotated approximately 360° whereby the curved cutting edge 28 is caused to cut through the remaining half of the bolt, in an obvious manner.

Another modification of the cutting tool is shown in Figure 4 wherein the handle is provided with adjustable means to permit of the cutting disc shearing bolts of different sizes. The handle 37 is formed with the laterally extending projection or jaw, on the upper end thereof, which is cut away to provide a relatively large recess 39 for receiving bolts of various sizes. The inner edge of the projection is preferably curved, as at 40, so that the bolt may be firmly gripped in position. A cutting disc 41, of a shape and design similar to the cutting discs hereinbefore described, is formed with an eccentrically curved peripheral cutting edge 42 wherein the gradient or curve, beginning with the point 43 on the periphery, extends and gradually increases in curvature to a point 44 on the periphery immediately below and inset from the point 43.

The cutting disc 41 is rotatably mounted on the handle 37 for vertical adjustment thereon by forming a substantially U-shaped bayonet slot 45 having the perpendicular and two parallel side slots 46, 47 and 48 respectively. Projecting through the slot 45 is a threaded bolt 49 having a hexagonal nut 50 on the upper end thereof which retains the bolt within the slot and extends through the hexagonal opening 51 in the disc. Thus, when the bolt 49 is arranged in the upper side slot 47, the cutting disc will be moved closer to the upper end of the bolt receiving recess 39 whereby a bolt 52 of relatively small diameter positioned therein, will be engaged and severed by the eccentrical cutting edge 42 of the disc as the latter is rotated, in a manner previously described in detail. By positioning the bolt 49 in the outer side slot 48, the disc is moved away from the bolt receiving recess 39 so that a larger bolt 53 may be positioned therein and cut when the disc is rotated. If desired, additional slots, not shown, may be provided in the handle to permit of the cutting disc being adjusted so as to cut larger or smaller bolts. It may also be desirable to provide a different type of slot or slots, or some other means, in the handle, to permit of the cutting disc being adjusted relative to the handle, for the purpose hereinabove set forth.

While a preferred form and two modifications of my bolt cutting or shearing tool have been illustrated and described, it is to be understood that various changes and modifications may be made therein without departing from the scope and spirit of the appended claims.

Having thus described my invention:

What I claim is:

1. In a cutting tool of the character described comprising a handle having a bolt engaging recess at one end thereof for engaging bolts of different diameters, a substantially eccentric cutting disc rotatably mounted on said handle and having a gradiently curved peripheral cutting edge, means on said handle for adjusting said disc relative to said bolt engaging recess to permit said disc to cut bolts of different diameters, said disc being adapted to be rotated on said handle relative to a bolt arranged in said gripping recess whereby said gradiently curved cutting edge gradually cuts and severs the bolt to be cut.

2. In a cutting tool of the character described comprising a handle having a bolt engaging recess at one end thereof for engaging bolts of different diameters, a substantially eccentric cutting disc rotatably mounted on said handle and having a gradiently curved peripheral cutting edge, means on said handle movably extending through an aperture in said disc for adjusting said disc relative to said bolt engaging recess to permit said disc to cut bolts of different diameters, said disc being adapted to be rotated on said handle relative to a bolt arranged in said recess whereby said gradiently curved cutting edge gradually cuts and severs the bolt to be cut.

3. In a cutting tool of the character described comprising a handle having a bolt receiving and gripping recess at one end thereof, a substantially eccentric cutting disc rotatably mounted on said handle and having a gradiently curved peripheral cutting edge thereon, a relatively straight bolt engaging edge thereon adapted to be aligned and coact with the bolt receiving recess, so that a bolt is gripped therein by the curved peripheral cutting edge and said straight edge, said disc being adapted to be rotated on said handle relative to the gripped bolt whereby said gradiently curved cutting edge gradually cuts and severs the bolt.

4. In a cutting tool of the character described comprising a handle having a bolt receiving and gripping recess at one end thereof, a relatively flat, substantially eccentric cutting disc rotatably mounted on said handle and having a relatively sharp, gradiently curved, peripheral cutting edge thereon, said periphery being inset to provide a relatively straight bolt engaging edge thereon adapted to be aligned and coact with the side of the bolt receiving recess so that a bolt is gripped therein by the straight edge and the peripheral cutting edge, said disc being adapted to be rotated on said handle relative to the gripped bolt whereby said gradiently curved cutting edge gradually cuts and severs the bolt.

BURTON YORK.